March 12, 1963 P. L. MICHEL 3,081,052
VARIABLE STABILIZING MEANS
Filed June 3, 1957
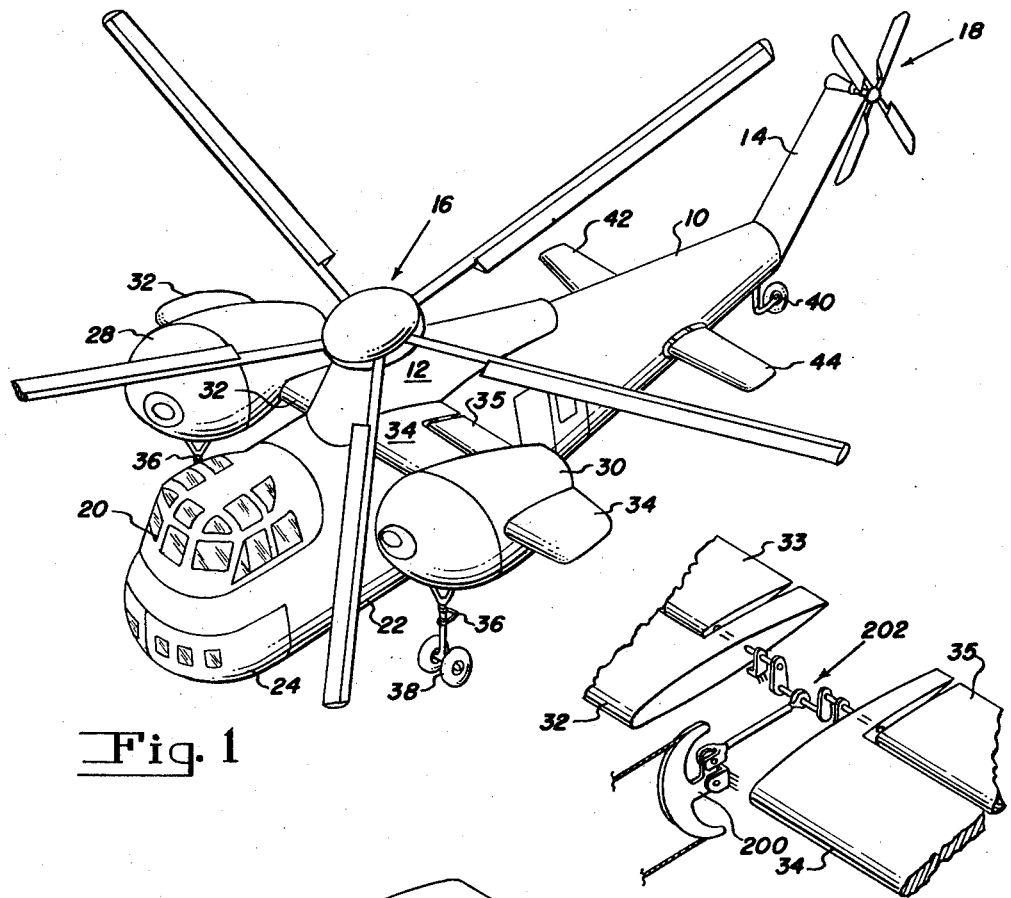
Fig. 1
Fig. 3
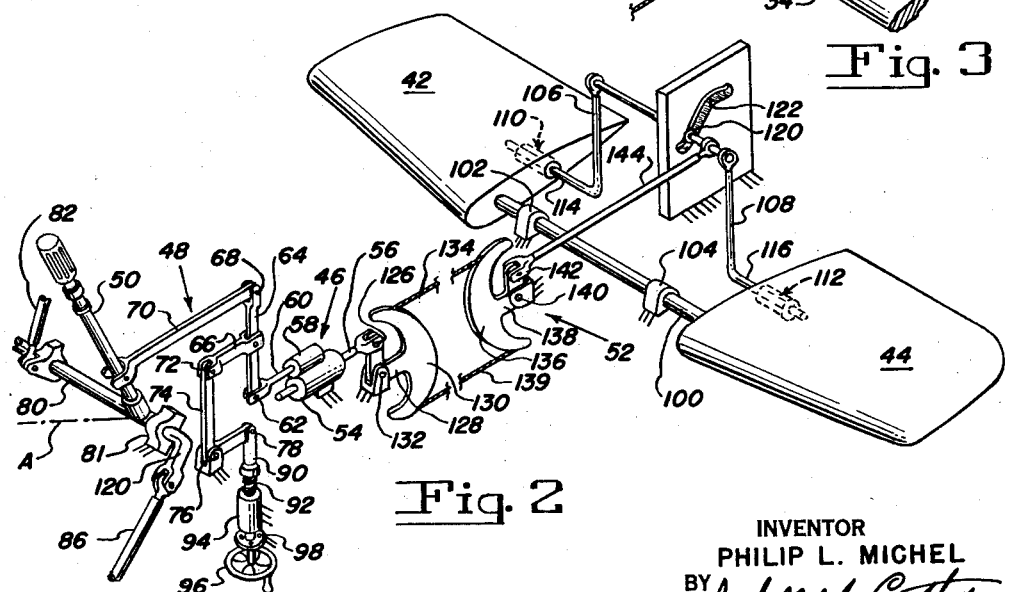
Fig. 2
INVENTOR
PHILIP L. MICHEL
BY
AGENT > United States Patent Office 3,081,052
Patented Mar. 12, 1963

3,081,052
VARIABLE STABILIZING MEANS
Philip L. Michel, Westport, Conn., assignor to United Aircraft Corporation, East Hartford, Conn., a corporation of Delaware
Filed June 3, 1957, Ser. No. 663,071
17 Claims. (Cl. 244—17.19)

This invention relates to aircraft and more particularly to adjustable stabilizing means for helicopters.

With the continuing improvement of helicopter performance, satisfactory flying qualities become more and more necessary if the performance capabilities are to be fully utilized. Many present-day helicopters are dynamically unstable longitudinally and are difficult to control in many flight attitudes. As a result, these helicopters do not fulfill the minimum requirements for flying qualities necessary for such important functions as all-weather operations.

An object of this invention is to provide a horizontal stabilizer with means for controlling the tail load and the helicopter attitude when the helicopter changes its flight condition from powered forward flight to autorotative forward flight.

Another object of this invention is to provide a cam means which will govern the movement of the stabilizer so that it will be positioned in a given schedule of settings in accordance with given control settings.

A further object of this invention is to provide means for varying the angle of incidence of a helicopter stabilizing surface with a change in collective pitch setting.

Another object of this invention is to provide a direct linkage between the collective pitch stick and a horizontal stabilizer to insure a forward motion of the cyclic control stick with increasing forward speed in both powered and autorotative flight.

A further object of this invention is to provide for an aircraft in which a fixed wing surface is employed, a lift control device, such as a means for changing a wing angle of incidence, or means for changing the angle of a flap of a wing in accordance with collective pitch movement.

Another object of this invention is to provide a connection from the collective pitch lever to a stabilizing surface to automatically set its angle of incidence, or position of any other lift control device, such that the distribution of lift on the rotor and surface is maintained at the optimum value particularly with regard to transition from powered flight to autorotative flight.

A further object of this invention is to provide means for maintaining a favorable angle of attack on a stabilizing surface of a helicopter between a normal forward flight attitude of said helicopter calling for a specific collective pitch lever setting and an autorotative attitude of said helicopter calling for a different specific collective pitch lever setting.

Although the novel features which are characteristic of this invention are set forth in more detail in the claims appended hereto, the nature and scope of the invention may be better understood by referring to the following description, taken in connection with the accompanying drawing forming a part thereof, in which certain specific constructions have been set forth for the purpose of illustration.

FIG. 1 is a perspective view of a helicopter including the invention.

FIG. 2 is an enlarged view of a modification of the invention in which tail stabilizing surfaces are actuated.

FIG. 3 is a view showing a portion of an arrangement whereby a flap mechanism in a wing is actuated.

Referring to FIG. 1, a helicopter embodying the invention comprises essentially an elongated fuselage 10 having a main rotor pylon 12 and a tail rotor pylon 14 on which are mounted the main rotor generally indicated at 16 and the tail rotor generally indicated at 18.

The fuselage has a pilot compartment 20 ahead of the main rotor pylon 12, which is located in the upper part of the nose section of the fuselage. The space beneath the pilot compartment extends well aft beneath the main rotor nylon and comprises the main cargo or passenger compartment 22 of the ship. Access to the cargo compartment is gained through a pair of clam shell doors 24 in the nose of the fuselage. The engines, of which two are provided, are mounted in engine nacelles 28 and 30 which are carried by wings 32 and 34, respectively. The wings are provided with trailing edge control surfaces 33 and 35.

The ship is supported on the ground by a tricycle landing gear including main oleo struts 36 and wheels 38 which depend from the nacelles 28 and 30 and by a tail wheel 40 depending from the fuselage just forward of the tail rotor cone 14. Stabilizer surfaces 42 and 44 shown in FIGS. 1 and 2 extend outwardly from the fuselage 10 and are actuated in a manner to be hereinafter described.

The main rotor is shown herein as having five blades. The usual pilot's controls are connected to the rotor blades through a control linkage and the usual swash plate mechanism for controlling the pitch of the blades. An aircraft of this type is generally shown in United States Patent No. 2,755,038 dated July 17, 1956. The collective pitch lever 50 is mounted on a rod 80 which is in turn mounted within the aircraft for rotation in brackets 81 (one shown in FIG. 2). Lever 50 is shown in its rearward position which calls for a high collective pitch and is movable to a forward position as indicated by dot-and-dash line A. Movement of collective pitch lever 50 along with rod 80 actuates rod 82 which in turn imparts its motion to a mechanism providing for collective pitch change. Such a mechanism is shown in United States application Serial No. 372,265 filed August 4, 1953, now abandoned, to Walter Gerstenberger et al. for a Gyro Stabilizer for Helicopter. Rod 80 has a portion 120 extending therefrom which is connected to a link 86 which is in turn connected to the engine throttles. This may be done in a manner such as shown in United States application Serial No. 640,270 filed February 14, 1957, now Patent No. 2,960,167, to Armand F. Amelio for Engine Control.

Collective pitch lever 50 is connected to horizontal surfaces 42 and 44 by a mechanism so as to operate them in a proper manner. This mechanism consists of (1) follow-up servo unit 46, (2) means 48 connected to the collective pitch lever for actuating said servo device, and (3) linkage 52 between said servo unit and said horizontal stabilizing surfaces.

The follow-up servo unit 46 located in the mechanism for operating the horizontal stabilizing surfaces 42 and 44 consists of a cylinder 54 fixed to said aircraft with a piston mounted therein on a piston rod 56 for movement within said cylinder. A servo valve 58 is fixed to said cylinder and is constructed as a conventional servo valve in that, in accordance with its movement by rod 60, said valve will direct a fluid under pressure to one side of the piston in cylinder 54 and connect the opposite side to drain. In this device, as the rod 60 is moved to the right, fluid pressure is directed to the left side of the piston in cylinder 54 while the right side of the piston is connected to drain. This action moves piston rod 56 to the right. Conversely, if rod 60 is moved to the left, fluid pressure is directed to the right of the piston in cylinder 54 while the left side of the piston is connected to drain. This action will move piston rod 56 to the left as viewed in FIG. 2. The servo unit prevents stabilizer control loads from feeeding back to the collective control. As the rod 60 is moved, its movement is transmitted to the servo valve to provide a follow-up action to properly position the rod. A follow-up servo unit of this type is shown and described in United States Patent No. 2,755,870 issued July 24, 1956, to Walter Gerstenberger (see FIG. 3).

The free end of rod 60 is pivotally attached at 62 to a lever 64 which is in turn pivotally mounted intermediate its ends to one end of a link 66. The other end of pivoted lever 64 is pivotally attached at 68 to a link 70. Link 70 is also pivotally attached to collective pitch lever 50. Link 66 has a pivotal attachment at 72 to one end of a bell crank lever 74 which is pivoted at 76 to fixed aircraft structure. The other end of bell crank lever 74 is pivotally attached at 78 to a movable collar 90. Collar 90 is made movable by being attached to the end of a threaded rod 92 which is movable axially in an internally threaded member 94 fixed to aircraft structure. The threaded rod 92 is rotated by means of a manually operable wheel 96 attached to an extension of rod 92 which is journalled in a bracket 98, also fixed to aircraft structure. It can be seen that with the wheel 96 fixed in any one position, the pivotal point 72 of bell crank lever 74 will also remain as a fixed point about which link 66 can rotate. This device is mainly for use in trimming an aircraft or in making changes to permit the use of this device on different aircraft.

The horizontal stabilizing surfaces 42 and 44 are mounted for movement about a rod 100 which is mounted for rotation in brackets 102 and 104 which are fixed to aircraft structure. Arms 106 and 108 extend upwardly from each of said horizontal stabilizing surfaces 42 and 44, respectively. The lower ends of arms 106 and 108 are pivotally mounted in the inner ends, respectively, of said horizontal stabilizing surfaces in bearing units 110 and 112, respectively. Arms 106 and 108 are provided with extensions 114 and 116 which project into said bearing units. The upper ends of arms 106 and 108 are connected by a rod 118. Rod 118 has a roller 120 thereon which is mounted in a cam groove 122 of a cam block 124. Cam block 124 is fixedly mounted within the aircraft structure. It can be seen that, as the rod 118 is moved, it has its movement confined to the shape of the cam groove 122. While only one cam block has been shown, to permit smoother actuation two blocks can be used, one near each end of rod 118. While a cam means has been shown, other suitable mechanisms can be used.

The rearwardly projecting free end of piston rod 56 is pivotally mounted at 126 to one end of a bell crank lever 128. Lever 128 has a cable segment 130 fixed to its other end. Bell crank 128 is pivotally mounted to fixed aircraft structure at 132. A cable 134 extends from one end of said cable segment 130 to one end of a cable segment 136 and a cable 139 extends from the other end of cable segment 130 to the other end of cable segment 136. Cable segment 136 is fixedly attached to one end of a bell crank lever 138 which is pivotally mounted to fixed aircraft structure at 140. The other end of bell crank lever 138 is pivotally mounted at 142 to an actuating rod 144. Actuating rod 144 is connected to rod 118 so as to impart motion thereto. This end of rod 144 can be constructed having a bushing arrangement around rod 118 to permit relative motion therebetween.

FIG. 3 discloses a modification in which a bell crank lever 200 is actuated by a cable segment to move trailing edge control surfaces 33 and 35 by means of linkage 202.

In the construction shown, to minimize cyclic stick motion in the transition from level flight to forward autorotative flight, cam 122 is contoured so that the trail incidence is approximately +5° in level flight and −7° in autorotation. These positions provide favorable angles of attack for the horizontal stabilizing surfaces between normal level flight of the helicopter and autorotation. Unfavorable moments are avoided as is the need for corrective action to overcome these moments. In addition, stalling of the horizontal stabilizing surface due to change in angle of attack is avoided. This system gives the desired incidence variation since the collective pitch is high in level flight and low in autorotation. With the collective pitch lever in its rearward position as shown in FIG. 2 and with the helicopter in normal flight, the horizontal stabilizing surfaces have a particular angle of attack. When engine failure occurs or when power is reduced to zero for autorotative flight and it is necessary to move the collective pitch lever 46 to a position along line A, the angle of incidence of the horizontal stabilizing surfaces is changed so that the angle of attack referred to above remains approximately the same. While for one given ship the angle of incidence may range between a +5° and −7°, it must be remembered that for other aircraft this range may vary. This will merely necessitate a change in the contour of the cam 122.

Operation

Assuming the helicopter to be in normal forward flight with the collective pitch lever in the position as shown in FIG. 2 and with the horizontal stabilizing surfaces in their position having an angle of incidence of approximately +5°, there are two means for varying this angle of incidence. If the pilot determines that this angle of +5° is not exactly right for this normal forward flight condition, the angle can be trimmed by movement of the manually operable wheel 96. This movement of wheel 96 will move the lower end of bell crank lever 74 either up or down which will in turn move the upper end of this bell crank lever either forwardly or rearwardly. This movement will impart to lever 64 through link 66 a movement about pivot 68 which will move rod 60 either to the left or right to control the servo unit 46. Movement of piston rod 56 in turn moves cable segment 130 to impart a like motion to cable segment 136. Movement of cable segment 136 on one end of bell crank lever 138 moves the other end of the bell crank lever in a rearward or forward direction. This motion moves rod 118 along its cam surface through link 144.

The other means for varying the angle of incidence of said horizontal stabilizing surfaces includes a connecting link 70 which is connected between a point on the collective pitch lever 50 and the top of lever 64. As the collective pitch lever is moved from its position as shown in FIG. 2 to a position along the dot-and-dash line A, which is the forwardmost position of the collective pitch lever 50 and the position to which said lever is moved for autorotation, link 70 rotates lever 64 about its pivotal mounting with one end of link 66. The other end of link 66 is being held stationary at this time. This movement of lever 64 moves its lower end to the right thereby actuating servo valve 58 of the servo unit 46. This valve in turn actuates the piston rod 56 so that it in turn moves to the right. This movement of piston rod 56 is transmitted through linkage 52 to move rod 118 along cam groove 122 to its rearward end.

While specific drawings and description form this specification, it is to be remembered that various modifications can be made without departing from the spirit of the claimed subject matter appended hereto.

I claim:

1. In a helicopter, a body, a sustaining rotor for said body, said rotor having blates thereon mounted for pitch changing movement, a collective pitch lever for controlling said blades, a member having an aerodynamic surface, said member extending laterally from the side of said body, means fixing said member against rotation about a vertical axis, said member being movable to different angles of incidence, means connected to said member for varying its angle of incidence with respect to said body, said last named means being responsive to movement of said pilot's collective pitch lever to position said member between a small positive angle of attack and a small negative angle of attack.

2. In a helicopter, a body, a sustaining rotor for said body, said rotor having blades thereon mounted for pitch changing movement, a collective pitch lever for controlling said blades, an aerodynamic surface on said body, said surface including a member projecting away from each side of said body and having an airfoil cross section, each of said members having its leading edge facing forwardly during normal flight, means mounting each of said members for movement about a spanwise axis to change their angle of incidence with respect to said body, means connected to said members for varying their angle of incidence with respect to said body, said last named means being responsive to movement of said pilot's collective pitch lever to position said member between a small positive angle of attack and a small negative angle of attack.

3. In a helicopter, a body having a fore and aft axis, a sustaining rotor for said body, said rotor having blades thereon mounted for pitch changing movement, a collective pitch lever for controlling said blades, an aerodynamic surface projecting away from said body, means mounting said surface about a fixed spanwise axis extending transversely of the fore and aft axis of the body, means connected to said surface for varying its angle of incidence with respect to said body, said last named means being responsive to movement of said pilot's collective pitch lever, said last named means including a cam fixed to said body to govern the position of said surface between a small positive angle of attack and a small negative angle of attack with respect to said pilot's collective pitch lever.

4. In a helicopter, a body, a sustaining rotor for said body, said rotor having blades thereon mounted for pitch changing movement, a collective pitch lever for controlling said blades, said collective pitch lever having forward flight and autorotation positions, an aerodynamic surface extending laterally from said body, said surface being mounted for pitch changing movements only so that its angle of incidence with respect to said body can be varied, said surface having a favorable angle of attack for a given collective pitch setting at normal forward flight, said surface having a second favorable angle of attack for a given collective pitch setting during autorotation and means connecting said surface to said collective pitch lever, said last named means including means for positioning said surface at substantially said second favorable angle of attack when said collective pitch lever is positioned in a position called for by autorotation.

5. In a helicopter, a body, a sustaining rotor for said body, said rotor having blades thereon mounted for pitch changing movement, a collective pitch lever for controlling said blades, an aerodynamic surface extending laterally from said body, said surface being mounted for pitch changing movements only so that its angle of incidence with respect to said body can be varied, means connecting said surface to said collective pitch lever, said last named means including means for positioning said surface at a favorable positive angle of attack when said collective pitch lever is positioned in a position for a normal forward flight, said last named means including means for positioning said surface at a favorable negative angle of attack when said collective pitch lever is repositioned in a position called for by autorotation.

6. In a helicopter, a body, a sustaining rotor for said body, said rotor having blades thereon mounted for pitch changing movement, a collective pitch lever for controlling said blades, an aerodynamic surface extending laterally from said body, said surface being mounted for pitch changing movements only so that its angle of incidence with respect to said body can be varied, means operably connecting said surface for movement with said collective pitch lever, said last named means including cam means for positioning said surface at a favorable positive angle of attack when said collective pitch lever is positioned in a position for a normal forward flight and for positioning said surface at a favorable negative angle of attack when said collective pitch lever is repositioned in a position called for by autorotation.

7. In a helicopter, a body, a sustaining rotor for said body, said rotor having blades thereon mounted for pitch changing movement, a collective pitch lever for controlling said blades, said collective pitch lever having forward flight and autorotation positions, an aerodynamic surface extending laterally from said body, said surface being mounted for pitch changing movements only so that its angle of incidence with respect to said body can be varied, cam means for positioning said surface, said cam means having a contoured cam which at one location positions said surface at a favorable positive angle of attack for a normal forward flight and at another location positions said surface at a favorable negative angle of attack for autorotation, means operably connecting said surface for movement with said collective pitch lever, said last named means placing said cam means in a normal forward flight location when said collective pitch lever is in its position for said normal forward flight and placing said cam means in an autorotation location when said collective pitch lever is in its position for said autorotation.

8. In a helicopter, a body, a sustaining rotor for said body, said rotor having blades thereon mounted for pitch changing movement, a collective pitch lever for controlling said blades, an aerodynamic surface projecting away from said body, said surface having an airfoil cross section, means pivotally mounting said surface to said body, means fixing said surface against rotation about a vertical axis, means connected to said surface for varying its angle of incidence with respect to said body, said last named means being responsive to movement of said pilot's collective pitch lever, said last named means also being responsive to manual control for movements of said surface alone.

9. In a helicopter, a body, a sustaining rotor for said body, said rotor having blades thereon mounted for pitch changing movement, a collective pitch lever for controlling said blades, an aerodynamic surface projecting away from said body, said surface having an airfoil cross section, means pivotally mounting said surface to said body, means fixing said surface against rotation about a vertical axis, cam means connected to said surface for varying its angle of incidence from a small positive angle to a small negative angle in accordance with a predetermined schedule as it moves about its axis with respect to said body, means for moving said surface through said last named means, means operably connecting said collective pitch lever to said means for moving said surface, said last named means including a lever pivotally connected intermediate its ends to said body, one end of said lever being pivoted to said means for moving said surface, the other end of said lever being connected to said collective pitch lever.

10. In a helicopter, a body, a sustaining rotor for said body, said rotor having blades thereon mounted for pitch changing movement, a collective pitch lever for controlling said blades, an aerodynamic surface projecting away from said body, said surface having an airfoil cross section, means pivotally mounting said surface to said body, means fixing said surface against rotation about a vertical axis, means connected to said surface for varying its angle of incidence with respect to said body, means operably connecting said collective pitch lever to said means connected to said surface for varying its angle of incidence between a small positive angle and a small negative angle, said last named means including a lever pivotally connected intermediate its ends to said body, one end of said lever being pivoted to said means connected to said surface for varying its angle of incidence, the other end of said lever being connected to said collective pitch lever, means for moving said pivotal connection of said lever for actuating said means connected to said surface independently of movement of said collective pitch lever.

11. In a helicopter, a body, a sustaining rotor for said body, a tail rotor for said body, said sustaining rotor having blades mounted for pitch changing movement, a collective pitch lever for controlling said blades, an aerodynamic surface on said body, said surface including a member projecting away from each side of said body and having an airfoil cross section, each of said members being pivotally mounted with relation to said body, said members being located between said sustaining rotor and tail rotor, and means connected to said members for varying their angle of incidence between a positive angle and a negative angle with respect to said body, said last named means being responsive to movement of said collective pitch lever.

12. In a helicopter, a body, a sustaining rotor for said body, a tail rotor for said body, said sustaining rotor having blades mounted for pitch changing movement, a collective pitch lever for controlling said blades, an aerodynamic surface on said body, said surface including a member projecting away from each side of said body and having an airfoil cross section, each of said members being pivotally mounted with relation to said body, said members being located between said sustaining rotor and tail rotor, and means connected to said members for varying their angle of incidence with respect to said body, a cam block located in said aircraft, said cam block having a cam groove therein, said last named means having a rod extending through said cam groove being adapted to be guided thereby, said last named means being responsive to movement of said collective pitch lever.

13. In a helicopter, a body, a sustaining rotor for said body, a tail rotor for said body, said sustaining rotor having blades mounted for pitch changing movement, a collective pitch lever for controlling said blades, an aerodynamic surface on said body, said surface including a member projecting away from each side of said body and having an airfoil cross section, each of said members being pivotally mounted with relation to said body, said members being located between said sustaining rotor and tail rotor, means connected to said members for varying their angle of incidence with respect to said body, a cam block located in said aircraft, said cam block having a cam groove therein, said last named means having a rod extending through said cam groove being adapted to be guided thereby, and means connecting said rod to said collective pitch lever so that said rod follows the cam groove in accordance with movements of the collective pitch lever.

14. In a helicopter, a body, a sustaining rotor for said body, a tail rotor for said body, said sustaining rotor having blades mounted for pitch changing movement, a collective pitch lever for controlling said blades, an aerodynamic surface on said body, said surface including a member projecting away from each side of said body and having an airfoil cross section, each of said members being pivotally mounted with relation to said body, said members being located between said sustaining rotor and tail rotor, means connected to said members for varying their angle of incidence with respect to said body, a cam block located in said aircraft, said cam block having a cam groove therein, said last named means having a rod extending through said cam groove and being adapted to be guided thereby, said members extending at a small positive angle of attack when said collective pitch lever is at its position calling for a high pitch, said last named means being connected to said collective pitch lever so that when said collective pitch lever is moving forwardly calling for a lower pitch the members are pivoted towards a negative angle of attack.

15. A rotary wing aircraft comprising a fuselage having a pilot's station thereon, a main lift rotor above said fuselage and rotatable thereover, said rotor comprising a hub and a plurality of rotor blades each of which is pivotable about its own axis relative to said hub whereby the pitch of each of said blades may be varied, a pilot operable control member movably positioned adjacent said pilot's station, means operatively interconnecting said control member with each of said rotor blades whereby simultaneous pivotal movement of said blades in the same direction about their respective axes may be effected by movement of said control member whereby blade pitch may be collectively and selectively modified, a tail plane stabilizer pivotally mounted on said fuselage for enhancing flight stability of said aircraft, said stabilizer extending transversely of said fuselage and being pivotable about an axis which is angularly related to the longitudinal axis of said fuselage, and means operatively connecting said stabilizer directly to said collective pitch control member so that movement of said member in a predetermined direction effects corresponding pivotal movement of said stabilizer in a predetermined direction in conjunction with modification of the collective pitch of said rotor blades.

16. A rotary wing aircraft comprising a fuselage having a pilot's station thereon, a main lift rotor above said fuselage and rotatable about a generally upright axis thereover, said rotor comprising a hub and a plurality of rotor blades projecting laterally from said hub each of which is pivotable about its own axis relative to said hub whereby the pitch of each of said blades may be varied for changing altitude of said aircraft during flight, a pilot operable control member movably positioned adjacent said pilot's station, means operatively interconnecting said control member with each of said rotor blades whereby simultaneous pivotal movement of said blades about their respective axes in unison and in the same direction may be effected by selective movement of said control member so that said blades may be simultaneously and selectively pivoted to decrease or increase their pitch in accordance with the direction of movement of said member, a tail plane stabilizer pivotally mounted on said fuselage for enhancing flight stability of said aircraft during horizontal, climbing or descending flight, said stabilizer extending transversely of said fuselage and being rotatable about an axis which is angularly related to the longitudinal axis of said fuselage, and means operatively and directly connecting said stabilizer to said collective pitch control member so that movement of said member in a predetermined direction effects simultaneous pivotal movement of said stabilizer in a predetermined direction, whereby an increase in the collective pitch of said rotor blades is accompanied by pivotal movement of the leading edge of said stabilizer upwardly, and vice versa.

17. A rotary wing aircraft comprising a fuselage having a pilot's station thereon, a main lift rotor above said fuselage and rotatable about a generally upright axis thereover, said rotor comprising a hub and a plurality of rotor blades projecting laterally from said hub each of which is pivotable in opposite directions about its own axis relative to said hub whereby the pitch of said blades may be varied for changing altitude of said aircraft during flight, a pilot operable control lever movably positioned adjacent said pilot's station, means operatively interconnecting said control lever with each of said rotor blades whereby simultaneous pivotal movement of said blades about their respective axes in unison and in a predetermined direction may be effected by selective movement of said control lever in a predetermined direction so that said blades may be simultaneously, selectively, and collectively pivoted to decrease or increase the pitch thereof in accordance with the direction of movement of said lever, a pair of tail plane stabilizers pivotally mounted on said fuselage for enhancing flight stability of said aircraft during horizontal, climbing or descending flight, said stabilizers extending transversely of said fuselage and each being rotatable about an axis which extends generally normal to the longitudinal axis of said fuselage, and means operatively and directly connecting each of said stabilizers to said collective pitch control lever so that movement of said lever in a predetermined direction effects simultaneous rotation of said stabilizers in a predetermined direction, whereby an increase in the collective pitch of said rotor blades is accompanied by pivotal movement of the leading edges of said stabilizers upwardly in unison, and vice versa.

References Cited in the file of this patent

UNITED STATES PATENTS

| | | |
|---|---|---|
| 2,381,968 | Bossi | Aug. 14, 1945 |
| 2,731,215 | Avery | Jan. 17, 1956 |

FOREIGN PATENTS

| | | |
|---|---|---|
| 595,987 | Great Britain | Dec. 24, 1947 |
| 1,018,400 | France | Oct. 15, 1952 |
| 1,071,019 | France | Mar. 3, 1954 |